US009258262B2

(12) United States Patent
Watt et al.

(10) Patent No.: US 9,258,262 B2
(45) Date of Patent: Feb. 9, 2016

(54) MAILBOX-BASED COMMUNICATIONS SYSTEM FOR MANAGEMENT COMMUNICATIONS SPANNING MULTIPLE DATA CENTERS AND FIREWALLS

(71) Applicant: Racemi, Inc., Atlanta, GA (US)

(72) Inventors: Charles Thomas Watt, Atlanta, GA (US); Scott Alan Leerssen, Atlanta, GA (US)

(73) Assignee: RACEMI, INC., Atlanta, GA (US)

( * ) Notice: Subject to any disclaimer, the term of this patent is extended or adjusted under 35 U.S.C. 154(b) by 271 days.

(21) Appl. No.: 13/874,076

(22) Filed: Apr. 30, 2013

(65) Prior Publication Data

US 2013/0290454 A1    Oct. 31, 2013

Related U.S. Application Data

(60) Provisional application No. 61/640,475, filed on Apr. 30, 2012.

(51) Int. Cl.
    *G06F 15/16*    (2006.01)
    *H04L 12/58*    (2006.01)
    *H04L 29/08*    (2006.01)

(52) U.S. Cl.
    CPC .......... *H04L 51/22* (2013.01); *H04L 29/08153* (2013.01)

(58) Field of Classification Search
    CPC .............. H04L 29/08072; H04L 29/06; H04L 29/08549; G06F 17/309; G06F 3/0697
    USPC ......... 709/204, 205, 206, 207, 213, 217, 218, 709/219, 223, 230
    See application file for complete search history.

(56) References Cited

U.S. PATENT DOCUMENTS

| 5,913,032 | A  | * | 6/1999  | Schwartz et al. ............. 709/213 |
| 6,662,212 | B1 | * | 12/2003 | Chandhok et al. ............ 709/206 |
| 6,836,881 | B2 | * | 12/2004 | Beynon et al. ................ 717/128 |
| 7,139,726 | B2 | * | 11/2006 | Fisher et al. ............... 705/26.81 |
| 7,356,679 | B1 |   | 4/2008  | Le et al. |

(Continued)

OTHER PUBLICATIONS

"WebMail: Mailboxes." CommuniGate Pro WebUser Interface: Mailboxes. Stalker Software, Inc., Jun. 18, 2006. Web. Apr. 17, 2015. <https://www.communigate.com/communigatepro/WebMailbox.html>.*

(Continued)

*Primary Examiner* — Liangche A Wang
*Assistant Examiner* — Kaylee Huang
(74) *Attorney, Agent, or Firm* — Morris, Manning & Martin, LLP; John R. Harris

(57) ABSTRACT

System and methods for effecting communications between a trusted management process and one or more managed processes in a distributed computing environment where direct communications between processes via a data communications network is blocked by a firewall or other security system. The method includes a file server that is accessible to all communicating processes. The file server provides a secure mailbox for each managed process. The mailbox is used to hold messages that are stored as individual files. The management and managed processes communicate by writing and reading files in the mailbox of the managed process. The stateless manner of the message-based communications makes it easy to replicate the management process in order to provide scalability and fault-tolerance for the management functions.

27 Claims, 7 Drawing Sheets

Communicating Through Firewalls Using
Management Mailboxes

(56) References Cited

U.S. PATENT DOCUMENTS

| | | | |
|---|---|---|---|
| 7,430,740 B1* | 9/2008 | Molloy et al. | 718/101 |
| 7,769,720 B2* | 8/2010 | Armington | 707/654 |
| 8,028,191 B2* | 9/2011 | Brown et al. | 714/6.12 |
| 8,417,938 B1 | 4/2013 | Considine et al. | |
| 8,452,856 B1 | 5/2013 | Lent et al. | |
| 8,468,204 B2* | 6/2013 | Clarke | 709/206 |
| 2002/0143855 A1* | 10/2002 | Traversat et al. | 709/202 |
| 2003/0084106 A1* | 5/2003 | Erev et al. | 709/206 |
| 2003/0126202 A1 | 7/2003 | Watt | |
| 2004/0199609 A1 | 10/2004 | Papatla et al. | |
| 2005/0228824 A1* | 10/2005 | Gattuso et al. | 707/104.1 |
| 2005/0235136 A1* | 10/2005 | Barsotti et al. | 713/1 |
| 2006/0047763 A1* | 3/2006 | Lin | 709/206 |
| 2008/0163207 A1* | 7/2008 | Reumann et al. | 718/1 |
| 2009/0244073 A1* | 10/2009 | Uchida | 345/522 |
| 2010/0306380 A1 | 12/2010 | Dehaan | |
| 2011/0055396 A1 | 3/2011 | Dehaan | |
| 2012/0166709 A1* | 6/2012 | Chun | 711/103 |
| 2013/0054523 A1* | 2/2013 | Anglin et al. | 707/624 |
| 2013/0054530 A1 | 2/2013 | Baker et al. | |
| 2013/0166923 A1 | 6/2013 | Tsuhara | |
| 2013/0179548 A1* | 7/2013 | Singh et al. | 709/220 |
| 2013/0198354 A1 | 8/2013 | Jones et al. | |
| 2013/0254520 A1 | 9/2013 | Birnkrant et al. | |
| 2013/0282887 A1 | 10/2013 | Terayama et al. | |
| 2013/0332588 A1 | 12/2013 | Maytal et al. | |

OTHER PUBLICATIONS

"Mailbox HBase." Mailbox HBase. The Apache Sofware Foundation, Dec. 18, 2011. Web. Apr. 16, 2015. <http://james.apache.org/mailbox/mailbox-hbase.html>.*

"Permissions for Files and Folders." Permisson for Files and Folders: User Rights; Security Policy; Security Services. Microsoft, Jan. 21, 2005. Web. Apr. 16, 2015. <https://technet.microsoft.com/en-us/library/cc787794(v=ws.10).aspx>.*

Non-Final Office Action dated Jun. 12, 2015 for related Non-Provisional U.S. Appl. No. 13/874,015.

Taylor, M., "WebSphere MQ Primer: An Introduction to Messaging and WebSphere MQ" (Dec. 2012), IBM Redbooks, pp. 1-64 [retrieved from www.redbooks.ibm.com/redpapers/pdfs/redp0021.pdf].

* cited by examiner

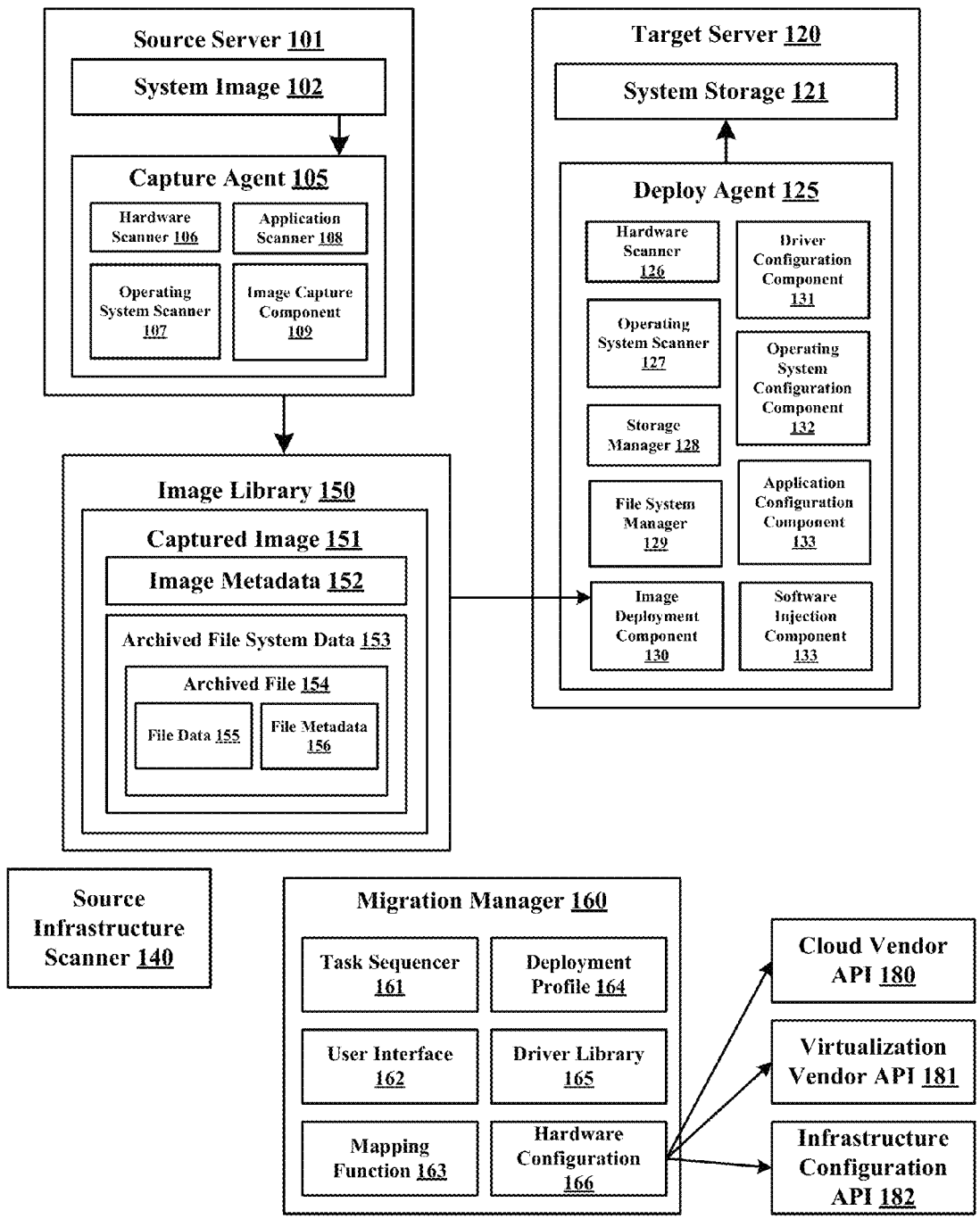
FIG 1: System 100

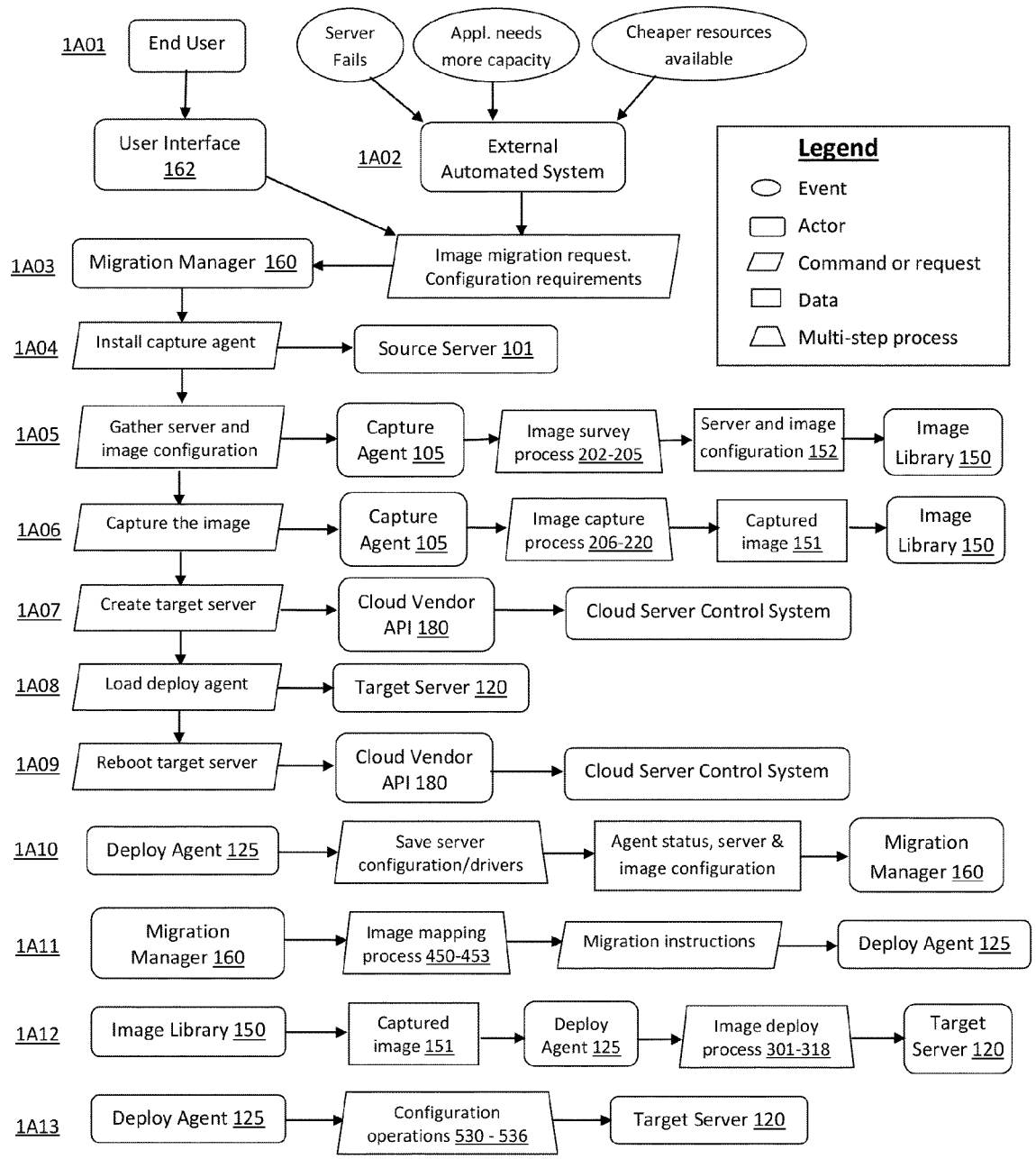
Figure 1A: The Image Migration Process

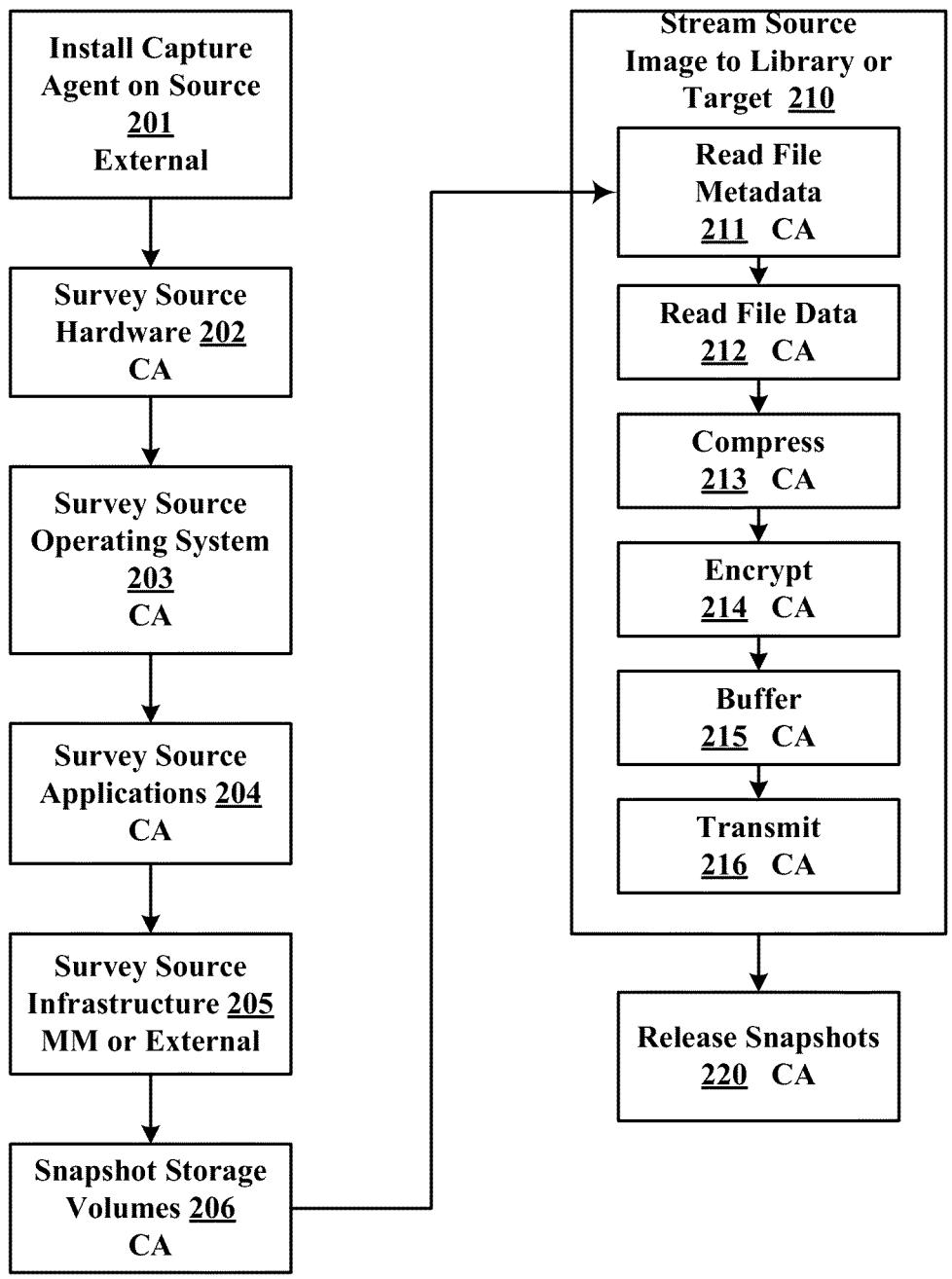
FIG 2: Image Capture Process

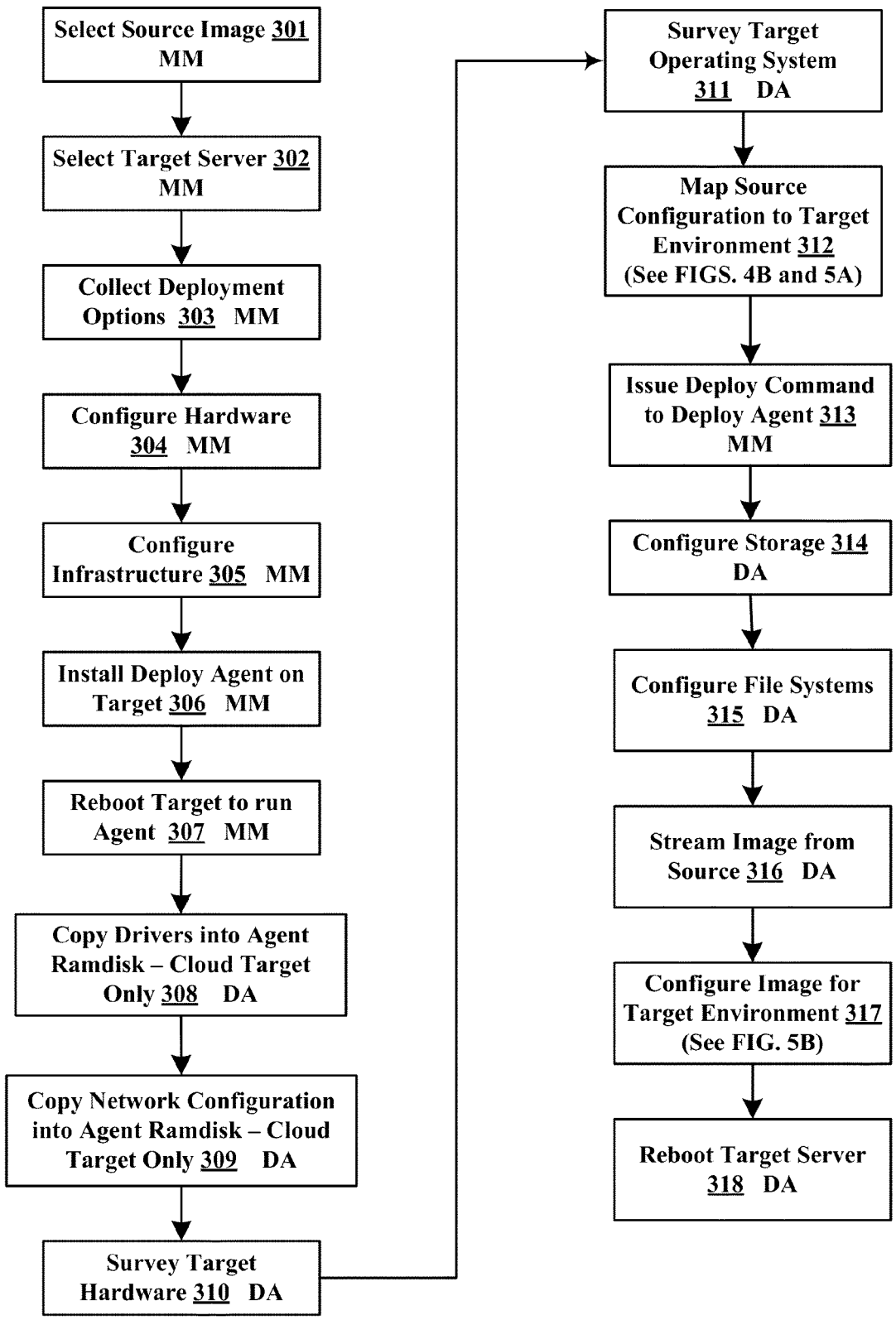
FIG 3: Image Deploy Process (Top-level)

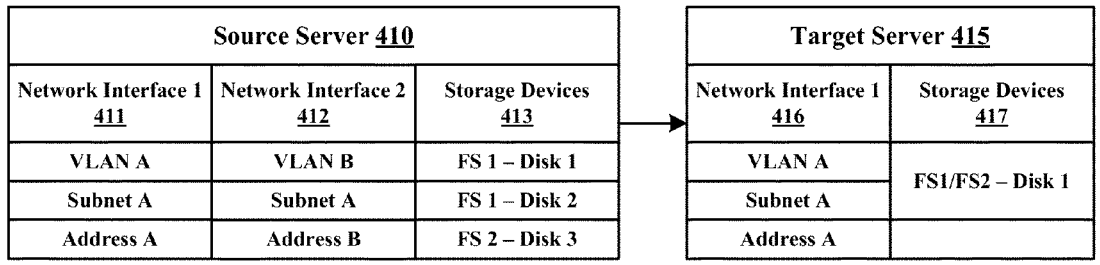
FIG 4a: Image Mapping Example
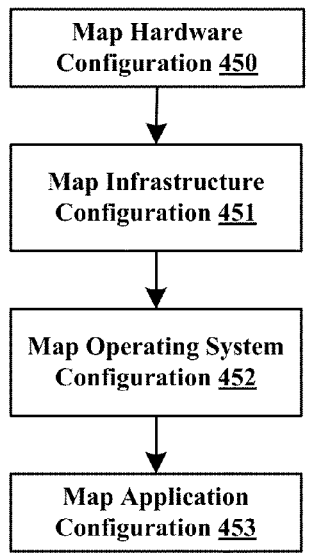
FIG 4b: Image Mapping Process (MM)

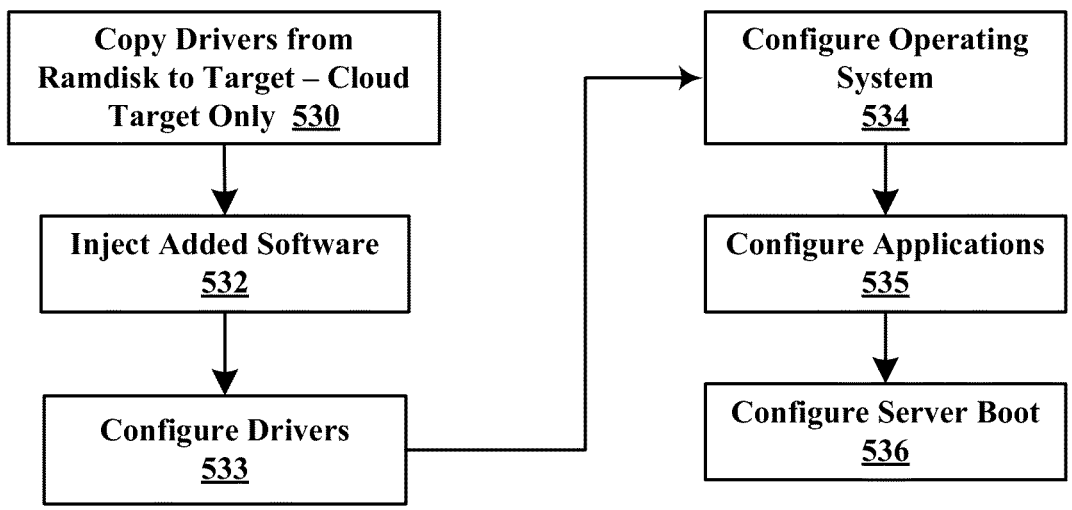
FIG 5: Image Configuration Process (DA)

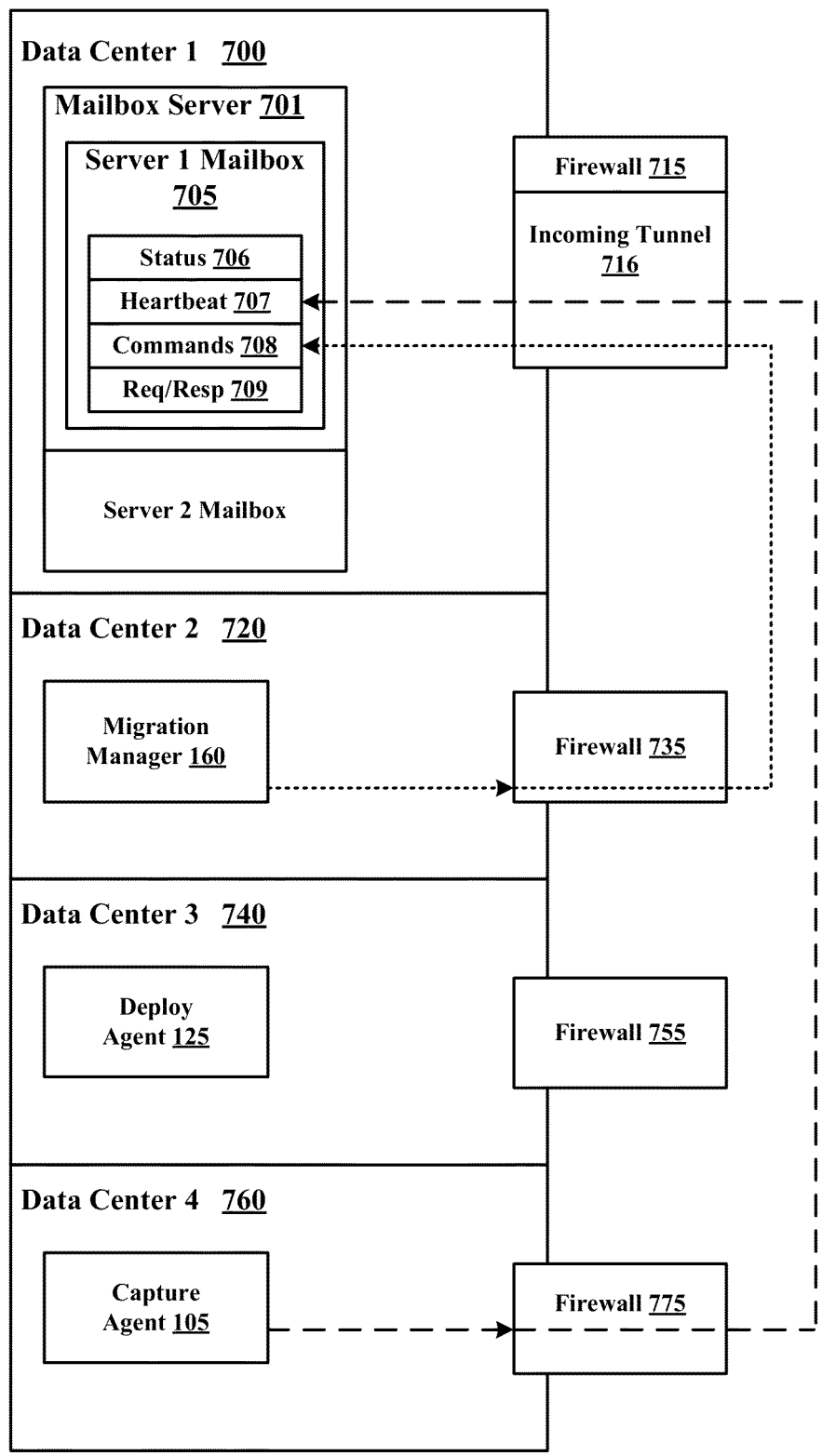
FIG 6: Communicating Through Firewalls Using Management Mailboxes

_US 9,258,262 B2_

MAILBOX-BASED COMMUNICATIONS SYSTEM FOR MANAGEMENT COMMUNICATIONS SPANNING MULTIPLE DATA CENTERS AND FIREWALLS

CROSS-REFERENCE TO RELATED APPLICATIONS

This application claims benefit under 35 U.S.C. §119(e) of U.S. Provisional Patent Application No. 61/640,475, filed Apr. 30, 2012, and entitled "Server Image Migration into Public and Private Cloud Infrastructures," which is incorporated herein by reference as if set forth herein in its entirety.

This application is also related to co-pending application U.S. Nonprovisional Patent Application No. 13/874,015, filed Apr. 30, 2013.

TECHNICAL FIELD

The present disclosure relates to physical, virtual, and cloud servers and the methods and apparatuses for migrating an image between them.

BACKGROUND

A server is a computer system that provides some type of service to one or more client computer systems. Clients typically access the service using a network connection: local clients over a local area network (LAN), remote clients over a wide area network (WAN).

A server image is a logical embodiment of a server that contains all of the data needed to boot and operate one or more services on a computer. A server image typically includes (but is not limited to) a kernel and operating system(s), device drivers (that are normally associated with hardware-related components), application software and data, and configuration settings associated with the network and storage environments.

A server can run an image by having the image installed into its permanent memory or onto a storage device accessible to the server. Alternately it can dynamically access the image via a network connection.

Because a server image includes device drivers and several other hardware-related components that are specific to the computer hardware on which it runs, and because the image includes configuration settings for the network and storage environments surrounding the computer on which it runs, an image will not function properly when moved from one computer environment to another without being significantly reconfigured. The "migration" process moves an image from one computer to another, reconfiguring it as appropriate for the new computer hardware and environment.

The embodiment of a single server running an image to provide one or more services is often called a "workload". On the basis of current technology, typically there are three ways to run a workload, e.g., when the single server is functioning as: 1) a physical server, 2) a virtual server, and 3) a cloud computer. A physical server is a dedicated physical computer running a single workload such that the operating system has exclusive, direct access to the computer's hardware. A virtual server is a workload running concurrently on a virtualization host such that the virtualization host intercedes between the computer hardware and the operating system within the workload to manage access to the physical resources of the underlying computer. Common virtualization hosts would include computers running a VMware™ or Xen™ hypervisor. A cloud computer is a workload running on a pool of physical and/or virtual resources that can be dynamically allocated on demand to a varying number of workloads. Clouds can be "private" such that the physical resources are owned by the same entity that owns the workloads, or "public" such that the physical resources are owned by a third party and made available for use by the workload owner, typically for a fee.

Physical, virtual, and cloud servers provide different tradeoffs between total cost of ownership (TCO) and performance. Physical servers generally provide the best performance but generally have the highest TCO. Virtual servers reduce TCO by running multiple workloads on a single physical computer, but generally provide lower performance because they cannot provide a single workload with access to all the resources of that computer. The use of cloud servers can greatly reduce the capital cost component of TCO when dynamically scaling a service to match its current load. This is particularly effective when using public clouds where the capital costs are born by a third party.

The optimal placement of a workload, whether on a physical, virtual or cloud server, might change over time for many reasons such as the life cycle (development, test, production, etc.) of the service, the number of clients currently accessing the service, or the availability of more efficient physical resources. The TCO of a workload would be greatly reduced if there were a way to rapidly migrate it from one server to another, freely moving between physical, virtual, and cloud servers so that it can always be placed on the most cost-effective resource that meets its current needs.

Conventionally, the process of migrating a workload from one server environment to another is largely a manual process that is time consuming, error prone, and very expensive. The automated migration tools that exist today are limited in capability. Tools provided by the virtualization vendors such as VMWARE™ and CITRIX™ typically providing migration into their specific hypervisor environment. More general purpose tools such as Symantec's Ghost™ and Platespin's Migration™ Manager™ usually do not support cloud servers and cannot work outside a corporate LAN environment.

Therefore, there is a long-felt but unresolved need for a system and/or method that provides the ability to freely migrate a workload between any types of environments, e.g., between physical, virtual, and cloud environments.

BRIEF SUMMARY

The present disclosure meets the needs identified above by providing systems and methods for the migration of server images between physical, virtual, and cloud servers.

In an embodiment, the present disclosure describes a mailbox-based communications mechanism to support server management operations that span multiple data center environments and corporate firewalls. System and methods are disclosed for effecting communications between a trusted management process and one or more managed processes in a distributed computing environment where direct communications between processes via a data communications network is blocked by a firewall or other security system. A file server that is accessible to all communicating processes is provided. The file server provides a secure mailbox for each managed process. The mailbox is used to hold messages that are stored as individual files. The management and managed processes communicate by writing and reading files in the mailbox of the managed process. The stateless manner of the message-based communications makes it easy to replicate the management process in order to provide scalability and fault-tolerance for the management functions.

Other aspects of the disclosure relate to exemplary management and managed processes including but not limited to a capture agent that runs on the source server to survey the environment in which the image runs and capture the image, a deploy agent that runs on a target server (regardless of whether the target server is a physical, virtual, or cloud, server) in order to survey the target server environment and deploy the source image into that environment, a migration manager to coordinate the migration process and map the requirements of the source image onto the resources available in the target environment, and an image library in which to optionally store the image for later use.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 is an exemplary embodiment of a system for migrating server images between physical, virtual, and cloud servers.

FIG. 1a is a flow chart showing the high level computer implemented steps in an exemplary image migration process.

FIG. 2 is a flowchart showing computer-implemented steps in an exemplary image capture process, according to one embodiment of the present disclosure.

FIG. 3 is a flowchart showing computer-implemented steps in an exemplary image deploy process, according to one embodiment of the present disclosure.

FIG. 4a is an example of mapping an image from a source to a target environment.

FIG. 4b is a flowchart showing computer-implemented steps in an exemplary image mapping process, according to one embodiment of the present disclosure.

FIG. 5 is a flowchart showing computer-implemented steps in an exemplary image configuration process, according to one embodiment of the present disclosure.

FIG. 6 is a block diagram showing an exemplary method of communicating through firewalls using mailboxes.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

I. The Migration Process

Referring to FIG. 1, an exemplary embodiment of a system 100 that provides migration of server images between physical, virtual, and cloud servers. As shown, a source server 101 comprises an attached source image 102 and a capture agent 105. In one embodiment the source server is a physical server and the image is written on the server's disk drive that is directly attached to the server. In another embodiment the source server is a virtual server and the image is written to a virtual storage device managed by the virtualization host. In yet another embodiment the source server is a cloud server and the image is written to a storage volume managed by the cloud infrastructure. Those of ordinary skill in the art will appreciate that there are many ways to store a server image and make it accessible to the server such that the server can successfully boot and run the image. Any system, method or technique that is known in the art may be used for storing, booting, and running the image on the source server, whether a physical, virtual, or cloud server.

The capture agent 105 runs on a computer system that has access to the source image 102. In one embodiment the capture agent runs on the source server while the server is actively running the source image. This is called "live" image capture. In another embodiment the capture agent runs on the source server while the server is not actively running the source image. This is called "offline" capture. Any system, method or technique known in the art may be used for running the agent on the source server such that the source image is not active but still accessible to the server. Some examples include booting the agent from a CD-ROM or ISO image, or booting the agent from the network using PXE. In yet another embodiment, the capture agent runs on a computer other than the source server that has access to the source image. An example that involves capturing an image from a virtual server would be a virtualization host on which the virtual server is running An example that involves capturing an image from a physical server whose image is stored on a SAN volume would be some other computer that has access to the SAN volume.

The target server 120 is shown with its system storage 121 on which will be stored the migrated server image. Any form of storage that can hold a bootable server image can be used by an embodiment of the invention(s) described herein. Examples when the target server is a physical server would include (but are not limited to) directly attached disk drives, removable storage devices such as a flash USB drive, or network accessible storage such as a fibre-channel or iSCSI SAN volume. When the target server is a virtual server, its system storage will typically be a virtual disk drive managed by the virtualization host or a dedicated SAN LUN. When the target server is a cloud server, its system storage will be provided by the cloud infrastructure.

The deploy agent 125 runs on a computer system that has access to the target server's system storage. It is responsible for gathering information about the target server and its system storage, and for deploying the migrated image to the target storage. In one embodiment the deploy agent runs on the target server and writes the image directly to the target server's system storage. In another embodiment the deploy agent runs on some other computer system that has access to the target server's system storage. An example when migrating to a virtual server would be the virtualization host that is managing the virtual disk drive for the target server. An example when migrating to a physical server booting from a SAN volume would be some other computer that has access to the SAN volume.

The exemplary embodiment of the system 100 provides two methods for migrating a server image, a "direct" approach and a "capture/deploy" approach. The "direct" migration streams the source image directly from the capture agent 105 to the deploy agent 125. This approach has the benefit of copying the image just one time over the network.

Typically, such an approach has two disadvantages. Firstly, if a system image needs to be migrated a second time, then the entire migration operation has to be repeated. Secondly, the source image cannot be migrated if the source image no longer exists, is not currently accessible, or has become corrupted.

The "capture/deploy" approach works in two steps. First, the capture agent 105 captures the source image to an image library 150 where it is stored for later use. At some later time, the deploy agent 125 reads the image from the library and deploys it to the target server's system storage. By retaining a copy of the captured image, this approach can use a single capture to deploy multiple copies of the source image. Additionally, according to this approach, the deploy agent 125 can deploy the image after the source server and image no longer exist or have become corrupted, which can be useful for applications such as disaster recovery. FIG. 1a shows the high level flow for the two-step process.

As shown in FIG. 1, the migration manager 160 is responsible for controlling the migration process using a task sequencer 161, which coordinates and sequences the tasks required for server image migration across the capture agent 105, deploy agent 125, image library 150, and other components that participate in the process. The migration manager includes a user interface (UI) 162 that is used by a system administrator to interact with the migration manager, wherein the system administrator (the user) is an individual who is responsible for the server migration process. In other words, UI 162 provides a mechanism by which the user initiates capture, deploy, or direct migration processes. Also, UI 162 allows the user to specify configuration settings for the migration system 1A01, e.g., users can specify parameters specific to a particular process. According to aspects of the present disclosure, the UI 162 may be a command line interface (CLI), graphical user interface (GUI), or an application programming interface (API) by which the migration manager can be controlled by some other computer program. As shown in 1A02, an image migration process can also be initiated by an external automated system in response to an external event, such as the failure of a server, an application requiring additional capacity, or less expensive resources becoming available.

Now turning to FIG. 2, an exemplary image capture process is shown with the help of a flowchart. According to one aspect, several steps of the flowchart involved in an image capture process are performed by a capture agent 105, or by various components (e.g., Hardware Scanner 106, Application Scanner 108, and others) included within capture agent 105 (e.g., see FIG. 1). Such steps are annotated (within the flowchart) using the notation "CA", short for capture agent 105. According to another aspect, the image capture process typically begins with the installation step 201 of the capture agent. As previously described, the capture agent 105 can run on the source server in either a live or an off-line mode. Alternately, the capture agent can also run on some other computer that has access to the storage device holding the source server image. The description that follows herein generally applies to the live mode of running the agent on the source server. It will occur to one skilled in the art that any method can be used to run the capture agent on the live source server. For example, a method could involve manual installation using a CD-ROM, or automated installation using a patch management system. The installation of the capture agent is shown in 1A04.

Once installed, the capture agent surveys the environment 1A05 in which the image runs and saves relevant data so that such data can be subsequently used by the migration manager in an image mapping process. In one exemplary embodiment of the disclosed system, surveying tasks (e.g., in steps 202-205) are optional. As will be understood, a large number of surveying tasks, along with a greater detail of such tasks will improve the system's ability to accurately map the image's operating environment to the target server environment. Generally, the order in which these tasks are performed does not matter. Survey task step 202 in this exemplary embodiment involves taking an inventory of the source server hardware for identifying all physical or virtual hardware available to the source server. For example, hardware scanner component 106 (included in capture agent 105 as shown in FIG. 1) performs the survey task 202. Although not shown in FIG. 2, information relating to the inventory of the source server hardware is stored as part of the image metadata 152, wherein the image metadata 152 itself is further stored as part of the captured image 151, e.g., as shown in FIG. 1. The image metadata does not need to be stored physically with the image file system data, and also no limitations are imposed on the format in which the image metadata is stored. For example, the image metadata can be stored in a database, an XML file, or any other format commonly known in the art.

Next, in step 203, the capture agent 105 surveys the operating systems configuration settings of the source, e.g., by using an operating system scanner component 107. Although not shown in FIG. 2, such operating systems configuration settings are stored as part of the image metadata 152. Examples of operating systems configuration settings include (but are not limited to) configuration settings of all network interfaces including addresses, netmasks, gateways, routes, name servers, etc; configuration settings of the storage devices including disks, RAID groups, partitions, volume groups, logical volumes, file systems, attached SAN devices, remote file shares, etc; configuration settings of the user authentication system including any external services required for user authentication such as directory services, domain services, etc.

After the capture agent 105 surveys the operating systems configuration settings of the source, the capture agent 105 then surveys (at step 204) various services and applications installed within the source image. In one exemplary aspect, step 204 is performed by the application scanner component 108, included within capture agent 105 (see FIG. 1). It will be generally understood that in step 204, the application scanner component 108 gathers the configuration settings for each service or application, installed within the source image. Further, (not shown in FIG. 2), the capture agent 105 stores (along with the image metadata 152) the gathered configuration settings and associated application data. In one exemplary scenario, associated application data includes naming, addressing, or routing information for any network or storage resources used by the application. It will be understood that in scenarios wherein the original source environment of the image cannot be exactly duplicated at the target server as part of a migration process, some of these configuration settings may have to be modified in order for the application or service to function properly post migration.

The final survey task (step 205) is to survey the infrastructure surrounding the source server, including but not limited to any LANs or virtual LANs (VLANs) and any external storage devices to which the source server is connected. Typically this information cannot be determined from within the context of the source server itself and thus is gathered by accessing the management interfaces of the infrastructure systems. Thus, this task is usually performed by the migration manager 160 (also referred to herein as "MM") running on a computer that is trusted to access the infrastructure systems.

It will occur to one skilled in the art that many data center environments already have tools installed to map these infrastructure connections, for example, there are many common management tools using the simple network management protocol (SNMP). As shown in 205, the migration manager 160 can access a source ("External") infrastructure scanner 140 where available. If the source server is a virtual server, the virtualization host that is running the virtual server will typically provide the network and storage infrastructure. Accordingly, survey information related to the network and storage infrastructure can be obtained directly from the virtualization management system. If the source server is a cloud server, the cloud infrastructure will typically provide APIs by which this information can be retrieved.

After the survey of the source server environment, the capture agent begins the actual capture 1A06 of the source image file systems using its image capture component 109. Usually, there are two common approaches to capturing image file system data: file-based and block-based capture. File-based capture reads the file data out of the underlying file system, saving the data for each file separately in a manner that is independent of the original file system format and disk layout. This makes it easy to resize the file system, change the file system type, or change the storage configuration and layout when deploying the image onto a target server. Block-based capture reads and captures the file system layout as well as all file system data directly from the underlying storage by capturing all data blocks associated with the underlying storage. When used with compression, this is usually faster than file-based capture. It also allows for very efficient incremental updates on a block-by-block basis. It has the disadvantage of requiring the target deployment to use exactly the same size disk and file system type for image deployment. Although an embodiment of the present disclosure can use either technique, or any other image capture technique known in the art, the embodiment described in this disclosure uses file-based capture.

As the image capture operation will occur over a length of time that varies with the size of the image, if the source server is running and its applications are online, it is possible that the image data might change during the capture operation, resulting in an inconsistent and possibly invalid captured image. Thus when capturing an image from a running server, the image capture component 109 takes (at step 206) a snapshot of the volumes holding the image, if the capability is supported by the underlying storage subsystem. This helps ensure that the entire captured image is consistent for a single point in time.

For each of the file systems to be captured, the capture agent then streams (at step 210) the file system data to the target destination, which is either the image library 150 or the deploy agent on the target server 125. The file system data is processed one file at a time. At step 211, the file metadata is read and added to the stream. This typically includes file system attributes such as the ownership, access permissions, last creation or access time, etc. The file data is then read at step 212 and added to the stream. Any method or format known in the art can be used to encode or save the file data and metadata to the stream. This would include but is not limited to the tape archive format (tar), copy in-out (cpio) and other file archiving and backup formats. Typically all file systems that are mounted and in-use by the server will be captured. The user can optionally override this default and specify mounted file systems that are not to be captured or unmounted file systems that are to be captured. The user can also optionally specify the capture of raw disks, volumes, or partitions.

As these have no recognizable file system format, they are captured using block-mode capture.

Still referring to FIG. 2, the data stream can be optionally compressed at step 213. Over slow network environments, compression can greatly speed the capture operation. However, over very fast network environments it can actually slow down the capture operation if the capture agent cannot compress the data quickly enough to keep up with the network line speed. Compression can also be a disadvantage when performing a live capture as compressing the data will consume CPU cycles on the source server, perhaps impacting the performance of the applications. Any method or algorithm for data compression known in the art can be used to compress the data stream.

The archived file system data in the data stream can be optionally encrypted 214 to ensure its confidentiality if stored in an image library. Any encryption algorithm known in the art for encrypting a data stream can be used. As the data stream will need to be decrypted, key management and distribution is essential to ensuring the confidentiality of the file system data. Any method of key management known in the art can be used including, but not limited to, shared secret keys or public-key based distribution schemes. Like compression, encryption can adversely affect the performance of any applications running on the source server as it will consume CPU cycles.

For efficient network transfer, the data stream is typically buffered (step 215) and transferred at step 216 in blocks of a size efficient for the network technology in use. Any network technology for streaming data can be used to transfer the captured image to the destination. This would include but is not limited to the hypertext transfer protocol (HTTP), the secure socket layer protocol (SSL), the file transfer protocol (FTP), or a raw transmission control protocol (TCP) connection. After the image transfer has been completed, any volume snapshots that were used in the capture process are typically released at step 220.

When the captured image is not used for a direct migration, it is stored in an image library 150. Each captured image 151 contains the image metadata 152 gathered by the capture agent's survey steps 202-205 as well as the archived file system data 153. Each archived file 154 contains the file's data 155 and metadata 156. Any archive format known to the art can be used to represent and store the archived file system data. The discussions in connection with FIG. 2 are for purposes of example and explanation. According to aspects of the present disclosure, many modifications can be made to the above-mentioned steps, as will occur to one skilled in the art.

Now turning to FIG. 3, an image deploy process is shown. In one exemplary embodiment, and as shown in FIG. 3, various steps of the image deploy process are performed by different components of the disclosed system, e.g., migration manager (MM) 160, a deploy agent (DA), and others. Starting at step 301, a user (e.g., system administrator) specifies a source image and a target server 302. Further, the user also specifies deployment options (e.g., storage or file system layout, network configuration, etc.) specific to a particular deploy process. Accordingly, these are collected by the migration manager at step 303. As will be understood, the image source can be any server with an installed capture agent or any previously captured image. The target server can be a pre-existing physical, virtual or cloud server. Alternatively the user may identify a pool or group of servers from which to select an available target. In yet another alternative aspect, the user may specify the desired characteristics for the target server, such as type of CPU, number of CPUs, amount of memory, disk storage, etc, and allow the migration manager to select a suitable target from the pool of available servers. When deploying to a virtual server, the user may specify a target set of virtual resources in which to create a new virtual server, such as a specific virtualization host, a resource pool, data center, etc. When deploying to a cloud infrastructure, the user may specify the cloud vendor, the data center or region, set of resources such as an availability zone, and the type or size of server to be created.

The user can either start the deployment immediately or schedule it to occur at some later time or in response to a specific event, such as the failure of the original source server.

The migration manager's task sequencer 161 begins the actual deployment or migration operation by first configuring (at step 304) the target hardware by using the hardware configuration module 166 to communicate with the target infrastructure using the appropriate vendor's application programming interface (API), e.g., cloud vendor API 180 or virtualization vendor API 181. This is shown by 1A07. Specifically, the hardware configuration module 166 issues commands to create the server if it does not already exist, specify the system BIOS settings, the number of CPUs, the amount of RAM, the number and type of network interfaces, the number and type of storage interfaces, and the number, size, and type of storage devices.

In many scenarios, it may not be possible to configure the hardware for physical servers, as very few physical servers allow for dynamic configuration of their resources. To configure the hardware of a virtual server the migration manager will typically access the management system for the server's virtualization host in order to create a new virtual server matching the required configuration. To configure a cloud server the migration manager will typically access the cloud infrastructure's APIs in order to create a new virtual server matching the required configuration. In many scenarios, cloud providers limit the configuration options to a pre-defined set of approved hardware configurations. In such scenarios, it may be necessary to choose the predefined configuration that most closely matches the desired configuration.

In one aspect, configuring (at step 305) the infrastructure surrounding the target server is optional and usually involves specifying the connections between the target server and its surrounding environment. This includes but is not limited to: configuring the switch ports to which a network interface is connected, specifying the VLAN settings on the switch ports, specifying firewall rules to allow network access to the server, adding the server to a load balancing pool, and specifying the connection between a storage adapter and an external storage volume. To configure the target infrastructure, the migration manager will typically access an external infrastructure configuration component 182 using that component's APIs. For physical servers this might be an existing data center management system that controls the network and storage infrastructures within the data center. For a virtual server the migration manager will typically access the management system for the virtualization host, which controls the virtual infrastructure surrounding the virtual server. For a cloud server the migration manager will typically access the cloud infrastructure's APIs in order to specify the server's network and storage environment.

Once the target hardware and infrastructure have been configured, the task sequencer 161 installs (at step 306) a deploy agent to build out the new target image 1A08. In order for the deploy agent 125 to configure the storage for the target server and build out new file systems in which to load the image, the agent is to be run in a manner such that its own software is not run directly from the target storage. Otherwise it would cease to function when it reconfigured the target storage. In one embodiment of the present disclosure, the deploy agent 125 is run directly on the target server in a manner that does not require the agent software to be run from the target storage. In another embodiment of the present disclosure, the deploy agent 125 is installed on some other computer that has access to the storage system that will be used for the deployed image. The description of the deploy process provided below herein is based on the assumption that the deploy agent 125 is run directly on the target server in a manner that does not require the agent software to be run from the target storage. However, it will be understood that alternate embodiments wherein the deploy agent 125 is installed on some other computer, will include similar steps in a deploy process.

There are several methods known in the art for running a program such as the deploy agent on a computer without relying on the underlying storage. Any such method may be used. For example, in one embodiment of the present disclosure, the target server may be booted using a network boot protocol such as the pre-boot execution environment (PXE). In another embodiment of the present disclosure, the target server may be booted using an international organization for standardization (ISO) image of a compact disk read-only memory (CD-ROM).

Many cloud environments do not allow external management systems to access the local LAN environment of the cloud infrastructure, thus the migration manager will not have access to any PXE requests coming from the cloud servers. Also, many cloud infrastructures do not expose a mechanism for booting a server directly from an ISO image. In such environments one way to run the deploy agent on the target server is as follows: 1) have the cloud infrastructure create and boot a server of a type matching the image to be migrated—for example, when migrating a Windows 2008 image, create a Windows 2008 cloud server; 2) Package the deploy agent as a ramdisk image; 3) After the cloud server becomes available, copy the ramdisk image to the cloud server's file system; 4) Modify the server's boot loader configuration to run the deploy agent ramdisk rather than the cloud server image; and 5) Reboot the server 1A09. When the cloud server reboots it will then run the deploy agent image directly from the installed ramdisk, leaving the cloud server's disk drives free and available for provisioning. Some cloud infrastructures boot servers running the LINUX operating system directly without using a boot loader program. The deploy agent can be run on such systems in a manner similar to the method described above. But instead of modifying the boot loader configuration, the LINUX initialization program, /etc/init, can be replaced with a version modified to install the ramdisk image and run the deploy agent Some cloud environments provide a facility for taking a snapshot of a running cloud server and using the resulting snapshot as a template for creating new cloud servers. When such a facility exists, the time to create a cloud server with an installed deploy agent can be greatly decreased by installing the ramdisk and configuring the boot loader as described in the previous paragraph, and then taking a snapshot of the server rather than rebooting it. Creating a cloud server from the new template will then run the deploy agent from the ramdisk. This eliminates the time required in the original approach to copy the ramdisk over the network and reboot the cloud server.

Some cloud infrastructures provide linux servers on a Xen virtualization host using Xen's direct boot mode. This means that the virtualization host ignores the operating system kernel within the image and directly boots some other kernel specified by and maintained by the cloud infrastructure. This will only work if the image contains a set of drivers matching the kernel chosen by the cloud infrastructure. This would always be the case when creating a server from one of the cloud's own templates. But it is unlikely to be the case when migrating an image that originated outside the cloud into the cloud environment, with the result that the migrated server fails to boot. This problem can be fixed by installing the correct drivers—i.e., those matching the kernel used by the cloud infrastructure—during the image deploy process. The drivers can be easily packaged and installed during the software injection phase of the image configuration process 532. But this would require that a driver package be prepared for all of the kernels supported by the cloud infrastructure. Thus, when running on a cloud server target, the first step performed by the deploy agent is to mount the original system image created by the cloud provider and copy all device drivers into the agent's ramdisk 1A10. They can then be later installed into the deployed image in the driver configuration phase 533 of the image configuration process FIG. 5. This ensures that the drivers matching the kernel used to boot the cloud server are always copied into the migrated image.

Within many cloud infrastructures security and routing restrictions require the cloud server to use a very specific network configuration in order to communicate with the cloud infrastructure and external systems such as the migration manager. Thus, at step 309, the deploy agent when running on a cloud server target copies the original network configuration of the cloud server into the configuration of the deploy agent 1A10. This ensures that the deploy agent can communicate with the migration manager. Later this same network configuration will be read from the target server during the OS survey step 311 and then included in the image mapping process 312. This ensures that the required network configuration is transferred to the deployed target after migration.

After the initial steps specific to cloud deployment, the deploy agent surveys the target environment 1A10. First it uses its hardware scanner component 126 to survey the target server's hardware 310. The results of this survey are sent back to the migration manager as server metadata. The specific format of the metadata and the method for communicating it back to the migration manager do not matter. The example embodiment uses the same method used by the capture agent for capturing the image metadata.

For cloud deploys, the survey of the hardware configuration is followed by a survey of the operating system settings 311 by the operating system scanner 127. As will be generally understood, the operating system being surveyed is that of the deploy agent itself, which is generally not relevant to the migration of the image. But it is useful when migrating into public cloud environments and will be discussed in detail later herein.

After the target survey is complete, the operating environment and configuration of the source image is to be mapped onto the target environment 1A11, which consists of the hardware of the target server and the surrounding network and storage infrastructures 312. This mapping process is performed by the migration manager's mapping function 163 and is shown in more detail in FIG. 4b.

Server migration can be used to achieve many important uses within a production data center including but not limited to: hardware refresh, server virtualization, data center consolidation, rapid server recovery, disaster recovery, application scaling, lab management, and software lifecycle management. Each of these use cases has different requirements for how the configuration of the source image gets mapped into the target environment. An example of this image mapping process is shown in FIG. 4a. In the example shown, an image is moved from a source server 410 that has two network interfaces 411 and 412 and a set of storage devices 413 consisting of three disk drives to a target server 415 that has just one network interface 416 and a single disk drive 417. This is a typical example of server virtualization in which an existing physical server is removed and replaced with a new virtual server. In order to replace the original server without requiring changes to the applications running within the image or changes to other systems that might rely on the original server, the target server has to retain the source server's full configuration. Thus, both of the network configurations on the source server are moved onto the single network interface of the target server. The two file systems on the source server, which are spread over three disk drives, are to be moved onto the single disk drive of the target server. This is shown in the mapping equation 420, which is repeated here:

$$S_{src}=NI_1(V_a+N_a+A_a)+NI_2(V_b+N_b+A_b)+FS_1(D_1+D_2)+FS_2(D_3)\rightarrow$$

$$S_{tgt}=NI_1((V_a+N_a+A_a),(V_b+N_b+A_b))+D_1(FS_1+FS_2)$$

Where on the left side of the mapping ($\rightarrow$) $S_{src}$ is the source server; $NI_1$ is the source server's first network interface that is configured with VLAN A ($V_A$), network A ($N_A$), and address A ($A_A$); $NI_2$ is the source server's second network interface that is configured with VLAN B ($V_B$), network B ($N_B$), and address B ($A_B$); $FS_1$ is the source server's first file system, which is laid out on disks $D_1$ and $D_2$; $FS_2$ is the source server's second file system, which is laid out on disk $D_3$.

On the right side of the mapping ($\rightarrow$): $S_{tgt}$ is the target server; $NI_1$ is the target server's first and only network interface that is configured with two separate configurations 1) VLAN A ($V_A$), network A ($N_A$), and address A ($A_A$), and 2) VLAN B ($V_B$), network B ($N_B$), and address B ($A_B$); $D_1$ is the source server's first and only disk which contains two file systems $FS_1$ and $FS_2$.

In one exemplary scenario, if instead of replacing the original server we are replicating it for testing within a quality assurance (QA) lab, it will be necessary to change the VLAN assignments on the network configurations so the test copy of the server does not interfere with the still running production copy, e.g., on the target server $V_a \rightarrow V_x$ and $V_b \rightarrow V_y$.

Many public clouds provide the user with cloud servers that have two network interfaces, one with a fixed configuration that is used by the provider to communicate with the server, and a second flexible interface that can be configured as necessary to support the workload on the cloud server. Thus when moving the source server from the mapping equation above to a public cloud, the target server configuration may look more like:

$$S_{tgt}=NI_1(V_p+N_p+A_p)+NI_2((V_x+N_a+A_a),(V_y+N_b+A_b))+D_1(FS_1+FS_2)$$

Where the "P" configuration on the first network interface is the fixed configuration required by the cloud provider.

In order to handle a wide variety of use cases in a manner that is easy for the end user, the mapping function 163 generally provides the following features 1) its supports templates of migration mappings such as moving an image from a physical server to a virtual server; 2) it provides rule-based mappings to permit full automation; 3) it accepts user input that guides or overrides some or all of the automated mapping process. The combination of these features allows the migration manager to select an appropriate template based upon the context of the operation or simple cueing by the end user, and to then complete the mapping operation based upon the selected template and the automated rules engine.

In the example embodiment of FIG. 1, a deployment profile 164 is used to provide the end user's guidance or requirements for the mapping process. The deployment profile consists of a data structure or set of commands that define the mapping requirements. The specific format of the deployment profile does not matter and can be any form of data structure or commands known in the art such as an XML document, a database table, or a shell script. The migration manager's UI 162 allows the user to create, store, and edit deployment profiles, and to apply them to a migration or deploy operation. The deployment profile may provide any of the following: guidelines for the mapping rules; actual specifications for the configuration of network interfaces, gateways, routes, name servers, storage devices, logical volumes, file systems; a set of additional software modules to install; a set of device drivers to install; any other configuration settings or functions necessary to the mapping process. Profiles that have been previously saved can be reused as templates for later operations.

FIG. 4b shows the image mapping process in more detail. The mapping process consists of but is not limited to: mapping the hardware configuration 450, mapping the infrastructure configuration 451, mapping the operating system configuration 452, and mapping the application configuration 453. These steps can be performed in any order or can be performed together. The need for coordination between the mapping steps can be seen in the example of FIG. 4a. As the target server has fewer network interfaces than the source, the full configurations from the two hardware devices of the source are mapped to the one device on the target as part of the hardware mapping. One of the original VLAN configurations can be handled by the switching infrastructure surrounding the target server using untagged VLANs (infrastructure mapping), but as there can only be one untagged VLAN configured on a single switch port, the second VLAN configuration is handled using a tagged VLAN configured within the operating system.

Application configuration mapping 453 involves changing any configuration settings for an application that depend on specific hardware, infrastructure, or operating system configuration items that have been changed as a result of the mapping process. For example, if an application is configured to connect to a peer on a specific network address and that address has been changed as part of the mapping process, the application's configuration will need to be updated with the new network address. As the location, format, and interpretation of application configuration data is application specific, application mapping is generally limited to the primary applications of interest.

Once the mapping process is complete, the migration manager sends a deployment command 313 to the deploy agent 1A11. This command includes all of the information necessary to deploy the image to the target server. It includes but is not limited to: BIOS settings, hardware device settings such as a MAC address for a network interface device, RAID configuration, disk partitioning, volume configuration, volume group configuration, file system configuration, file system mount points, network address configuration, routes, gateways, name servers, operating system configuration, and application configuration. The format of the command does not matter and can be any format commonly known to the art such as remote procedure call (RPC), eXtensible Markup Language (XML), etc. As the deploy command conveys data for many subsequent steps, it can also be broken into multiple parts which are sent separately to the deploy agent.

After receiving the deploy command, the deploy agent begins the deployment process 1A12 by configuring (at step 314) the target server's storage devices. This involves but is not limited to: configuring adapter addresses such as the WWN of a fibre channel adapter or the iSCSI initiator name of an iSCSI adapter, configuring RAID groups and settings, partitioning disks, and creating volume groups and logical volumes.

After the target storage devices have been configured, the deploy agent builds (at step 315) out any file systems specified by the deploy command. It then mounts the file systems so that they can be populated with the archived file system data stored in the source image.

The deploy agent then opens the source image by connecting either to the capture agent, when performing a direct migration, or image library, when performing a separate deploy operation, and populates the file systems from the image stream 316. This process is the reverse of the image capture streaming process 210. Data is received from the source and buffered. If the data is encrypted, it is then decrypted. If the data is compressed it is then decompressed. Each file in the archived file system data is then written to the corresponding newly created target file system and any metadata is applied to the recovered file.

Some of the important advantages provided by a system constructed according to described herein compared to block-based approaches to server imaging are the ability to resize the image file systems, deploy image file systems to storage devices quite different from those on the source server, and to even change file system types. These advantages are a result of the process described above wherein the deploy agent configures the target storage devices and builds out new file systems using configuration parameters that might be different from the original source system due to the mapping process and optional user specifications. Because the blocks captured by a block-based imaging system include the file system layout from the source server, they only produce a useful image when written back to a storage volume of the same block size and overall size.

After all file systems have been recovered, the original source image has been transferred to the target storage, but is not yet configured to run in the target environment. The deploy agent then runs the image configuration process 317, 1A13, which is shown in more detail in FIG. 5. In the first step of the image configuration process, which is specific to cloud targets, the deploy agent copies at step 530 device drivers saved from the original target image built by the cloud infrastructure into the deployed image. This ensures that if the cloud infrastructure forces the use of a specific OS kernel, the matching drivers are available for configuration.

The image configuration then continues with the deploy agent optionally injecting at step 532 any added software to the image. This allows the deploy process to add things that might be necessary for a server to function in the target environment. Some examples would include but are not limited to: 1) adding a management agent that is needed for the server to function within a cloud infrastructure; 2) adding drivers and other software needed for the server to function properly on a virtualization host such as a VMware ESX server; 3) adding patches, security fixes, and other upgrades to the image that might have become available since the image was captured; 4) adding drivers that are necessary for the image to work with the target server's hardware; 5) adding custom configuration scripts to automate the migration of application software.

The image configuration process then continues with the insertion and configuration (at step 533) of any new drivers that are required for the image to function properly when run on the hardware of the target server. The deploy agent first looks for the required drivers within the target image where they might have been supplied by the operating system itself, by any injected software, or any saved cloud drivers. If the required drivers are not found within the image itself the deploy agent pulls them directly from the migration manager's driver library 165. The method by which the drivers are pulled from the driver library does not matter and can be any method of file retrieval known in the art such as HTTP or NFS. The deploy agent determines which drivers to pull based upon the hardware survey 310 that it previously conducted during the target survey process. On industry standard server hardware using the Peripheral Component Interconnect (PCI) bus, the PCI bus identifiers are unique to a given hardware device and can be used to identify the device and its associated driver. The method used to map hardware devices (or PCI IDs) on the target server to drivers in the library does not matter and can be any method of mapping known in the art such as a database or an XML file.

The details on how the driver library is built and maintained do not generally depend on the working of a system constructed according to aspects described herein but includes (at a minimum) the ability to add drivers by pulling them directly from a running server and adding them directly from media devices such as floppy disks and CD-ROMs.

After the drivers have been installed and configured, the deploy agent continues the image configuration process by configuring the operating system within the image at step 534 to account for any changes made by the mapping process, the software injection, and the driver changes. This typically includes the configuration of the network interfaces, gateways, routes, name servers, authentication servers, etc.

Next, at step 535, the deploy agent then makes any application-specific configuration changes that are necessary to account for changes that have been to the hardware, drivers, and operating system. This would include the running of any scripts injected for this purpose during the software injection phase (e.g., at step 532).

The deploy agent then configures the target image to boot on the target server at step 536. The procedure for this is specific to the type of server platform and the operating system within the image, but typically involves configuring the boot loader and writing changes to the master boot record (MBR).

The image migration process is now complete. The migration manager removes any controls that it might have used previously to boot the server with a deploy agent, such as a CD ISO image attached to the server, and reboots the target server (e.g., at step 318 in FIG. 3). When it boots, it will load and run the newly deployed target image.

III. A Mailbox-based Communications System for Management Communications Spanning Multiple Data Centers and Firewalls.

A significant issue facing any application that must communicate with servers across data center boundaries is how to communicate securely and reliably through corporate firewalls. This is particularly the case when migrating a server between data centers or from a private data center into a public cloud. FIG. 6 shows a server migration in which the capture agent 105, deploy agent 125, and migration manager 160 all reside in separate data center environments, 760, 740, and 720 respectively. The data centers are connected via an insecure public network, such as the Internet. Each data center is isolated from the public network using a firewall 775, 755, and 735 respectively. It is a common security policy for a corporate firewall to block all network connections that originate external to the data center and target a server within the data center. Thus any attempt by the migration manager to initiate communication with the capture agent will be blocked by the firewall 775. Likewise, any attempt by the capture agent to initiate communication with the migration manager will be blocked by firewall 735.

Aspects of the present disclosure describe a method to address this issue by using file-based management mailboxes, as shown exemplarily in FIG. 6. A mailbox server 701 provides a separate, protected mailbox for each managed server (i.e., source or target server). The mailbox server can reside in any data center, provided that it is supplied with adequate security, and provided that the firewall protecting the data center will allow incoming network connections to the mailbox server. In one embodiment, the mailbox server can be co-resident with the migration manager. In another embodiment, the mailbox server can reside in the same data center as the source or target servers. In yet another embodiment the mailbox server can be implemented using a public storage service such as Amazon's S3 storage.

The file-based management mailboxes provide several advantages over direct communications between the management system and the managed servers. All network connections originate with the servers within the protected data centers and pass out through the firewalls. This enables the management communications to pass through corporate firewalls without making changes to their existing security policies. Because the managed servers are not directly connected to any management server and instead communicate only with the mailbox server, the management system can be run in a stateless manner. This makes it very easy to implement fault tolerance and scalability within the management system. If a management server fails, it can be replaced without losing any data from or communications with the managed servers. Additionally, it will also be appreciated that as the management load grows, the management system can easily scale by adding additional management servers. At any time, any management server can handle interactions with any managed server.

FIG. 6 shows the contents of a single mailbox 705 that is owned by the capture agent 105. The access permissions to the mailbox directory are as follows: a trusted management system (such as the migration manager 160 in this example) can list the available mailboxes and can create and delete any mailbox; all other entities are not allowed to list the available mailboxes, but they are allowed to create a mailbox for themselves. In one aspect, the access permissions to an individual mailbox are set up as follows: 1) the owner of the mailbox has full read/write access to all contents of its mailbox; 2) trusted management systems have full read/write access to all contents of the mailbox; 3) all other entities cannot see the existence of the mailbox or the existence of any of its contents, but if given a universal resource identifier (URI) to a file within the mailbox, they have read-only access to that file.

In one exemplary embodiment, a system constructed according to aspects of the present disclosure (as described herein) supports two mailbox server implementations. The first mailbox server implementation uses Amazon's S3 storage service, which is accessed using the S3 protocol protected by the secure socket layer (SSL) protocol. The second mailbox server implementation uses the Web Distributed Authoring and Versioning (WebDAV) protocol protected by SSL. Those of ordinary skill in the art will appreciate that that any network service and protocols that provide secure access to files on a server can be used to construct alternate embodiments of the disclosed system.

When a management agent (such as the capture agent 105 in this example) starts for the first time, it creates a universally unique identifier (UUID) for itself and saves this UUID for future use, in case it has to restart in the future. Then, the management agent contacts the mailbox server 701, creating a mailbox 705 for itself using the UUID. The agent is able to contact the mailbox server because the connection goes out through its firewall. Outgoing connections are typically permitted by most corporate security policies. The connection reaches the mailbox server because the firewall in the data center hosting the mailbox server has been specifically configured to allow incoming connections to the mailbox server.

To ensure security of the mailbox mechanism, the managed server creates its UUID in a manner so as to ensure that the UUID cannot be guessed by anyone trying to gain access to its mailbox. In one example, the managed server uses a wide variety of information known only to itself, such as installation date to the millisecond, processor UUID, MAC address of network interfaces, serial number or UUID of disk drives, etc., so as to achieve 128 bits (or more) of randomness. Further, this information is then hashed using a cryptographic hashing algorithm such as MD5 or SHA-2 to create a UUID of at least sixteen hex digits.

After creating its mailbox, the agent gathers status information about itself, writing this information to a status file 706 in its mailbox. If the agent is a capture agent in an exemplary embodiment, the status information would include the source survey data 202, 203, and 204. However, if the agent is a deploy agent in another exemplary embodiment, the status information would include the target survey data 310 and 311.

After updating its status information, the agent writes a heartbeat file 707 to its mailbox. The heartbeat file contains a current timestamp and a value specifying the time interval between heartbeat updates.

After writing the heartbeat file, the agent updates the file within the interval that it specified in the file. In one aspect, failure to update the file within this interval will be considered a system failure by the management system and the agent will be considered offline. While updating the heartbeat file, the agent also checks for the existence of a command file 708, which if found, will contain one or more commands from a trusted management system. If the command file is present, it is read and then deleted. The contents of the file will contain one or more commands that are to be performed by the agent. Any response by the agent to the management system is written to a request/response file 709.

Any time the status of an agent changes, the agent updates its status file within its mailbox. For example, if the agent has to request a service from the management system or asynchronously send it some information such as an asynchronous alert, this is written to a request/response file 709. More than one request or response can be included in a single file, however, the agent does not modify the request/response file in any way once it has been written. The management system will typically delete the file after it has been processed as acknowledgement. As file locking on some network file systems can be very unreliable, if the agent needs to send additional requests or responses to the management system, the agent adds an additional request/response file using a sequence number (or some other method, as will occur to one of ordinary skill in the art) for indicating the sequence of the command files.

The management system (migration manager 160 in this example) detects new servers to manage by reading the list of mailboxes from the mailbox server and identifying any new mailboxes. The management system reads the status of a server by reading the status file 706 from the server's mailbox. The management system also detects the health of a server by reading the heartbeat file 707 from the server's mailbox and comparing the time stamp and interval to the current time. In one exemplary aspect, the health of a server is detected in the following manner. If the (current time−time stamp)>N×interval, where N is typically $2<=N<=5$, the server can be considered offline. The factor N is used to prevent false failures due to short-term loading on the managed server or short-term network issues.

If the management system needs to send a command to the managed server, such as a capture command in this example, it writes the command to a command file 708 within the server's mailbox. According to aspects of the present disclosure, one or more commands can be written to a single file. Generally speaking, once a file has been written, it is not modified. If the management system needs to add additional commands, additional command files are added using a sequence number (or some other method, as will occur to one of ordinary skill in the art) for indicating the sequence of the command files.

If the management system issues a command to a managed server for which a response is expected, the management system periodically checks the server's mailbox for a request/response 709 file. If the agent running on the managed server is performing an operation that can generate asynchronous service requests or information, then the management system periodically checks the server's mailbox for a request/response file.

Accordingly, it will be understood that various embodiments of the present system described herein are generally implemented as a special purpose or general-purpose computer including various computer hardware as discussed in greater detail below. Embodiments within the scope of the present disclosure also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the present disclosure may be implemented. Although not required, aspects of the present system are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the present system may be practiced in network computing environments with many types of computer system configurations, including personal computers, hand-held devices, multi-processor systems, microprocessor-based or programmable consumer electronics, networked PCs, minicomputers, mainframe computers, and the like. Also, the present system is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the invention(s), which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

Remote computers may be another personal computer, a server, a router, a network PC, a peer device or other common network node, and typically include many or all of the elements described above relative to the main computer system in which aspects of the present system are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the disclosed system is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention(s), it readily will be understood by those persons skilled in the art that the present invention(s) is/are susceptible to broad utility and application. While various aspects have been described in the context of a preferred embodiment, additional aspects, features, and methodologies of the present invention(s) will be readily discernable from the description herein, by those of ordinary skill in the art. Many embodiments and adaptations of the present invention(s) other than those herein described, as well as many variations, modifications, and equivalent arrangements and methodologies, will be apparent from or reasonably suggested by the present invention(s) and the foregoing description thereof, without departing from the substance or scope of the present invention(s). Furthermore, any sequence(s) and/or temporal order of steps of various processes described and claimed herein are those considered to be the best mode contemplated for carrying out the present invention(s). It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present invention(s). In addition, some steps may be carried out simultaneously.

What is claimed is:

1. A method for effecting communications between a trusted management process executing on a first computer system and a plurality of managed processes executing on one or more second computer systems in a distributed computing environment, the trusted management process and the managed processes being connected for electronic communications via a data communication network with a mailbox server executing on a third computer system, comprising the steps of:

providing a mailbox server on a third computer system for communications between the trusted management process and the managed processes, the mailbox server hosting a first mailbox associated with a first managed process and a second mailbox associated with a second managed process, the first mailbox storing one or more messages used for communications between the trusted management process and the first managed process, the second mailbox storing one or more messages used for communications between the trusted management process and the second managed process, each message comprising a digital file stored within a mailbox on the mailbox server, each file within a mailbox having a file name and a predetermined data format that is specific to the type of message being communicated between the trusted management process and the managed process, the mailbox server controlling access to the files stored within each mailbox such that the files are accessible only to the managed process associated with the mailbox and the trusted management process;

the mailbox server providing secure communications between the trusted management process and the managed processes by enforcing predetermined access control policies for each mailbox;

the first managed process creating a mailbox on the mailbox server for use in communicating with the trusted management process using a universally unique identifier (UUID);

the trusted management process scanning the mailboxes on the mailbox server at predetermined intervals to identify new mailboxes created by managed processes;

the trusted management process sending a message to the first managed process by writing a file of a predetermined name and format to the mailbox of the first managed process;

the first managed process accessing the message from the trusted management process by scanning the mailbox of the first managed process on the mailbox server for a file of the predetermined name at predetermined intervals, the first managed process sending a message to the trusted management process by writing a file of a predetermined name and format to the mailbox of the first managed process on the mailbox server; and the trusted management process receiving the message from the first managed process by the scanning the mailbox of the first managed process for a file of the predetermined name at predetermined intervals.

2. The method of claim 1, wherein the trusted management process and the managed processes cannot directly communicate via a data communications network due to a lack of connectivity or the presence of a security device.

3. The method of claim 1 wherein the predetermined access control policies comprise:
(a) an access control policy for the trusted management process that permits the trusted management process to list the available mailboxes, create a new mailbox, delete any mailbox, and list, create, modify, read, and delete any file within any mailbox;
(b) an access control policy for each managed process that disallows each managed process to list the available mailboxes, but permits each managed process to create an associated mailbox at the mailbox server, delete the associated mailbox, and list, create, modify, read and delete files in the associated mailbox.

4. The method of claim 1, wherein the mailbox server is implemented using an electronic mail server.

5. The method of claim 1, wherein the mailbox server is implemented using a file server that provides list, read, write and delete operations on directories and files stored on the file server.

6. The method of claim 5, wherein the file server provides services using a file service protocol selected from the group comprising: File Transfer Program (FTP), File Service Protocol (FSP), Secure Shell File Transfer Protocol (SFTP), Web Distributed Authoring and Versioning (WebDAV), Amazon's S3 protocol (S3), Network File System (NFS), Server Message Block (SMB), or Common Internet File System (CIFS).

7. The method of claim 1, wherein the message file is stored using a structured format selected from the group comprising: Simple Object Access Protocol (SOAP), JavaScript Object Notation (JSON), or eXtensible Markup Language (XML).

8. The method of claim 5, wherein each mailbox is implemented as a separate directory on the file server.

9. The method of claim 8, wherein a managed process creates an associated mailbox on the mailbox server by creating a directory on the file server using the UUID of the managed process as the name of the directory.

10. The method of claim 9, wherein the UUID used as the directory name is created using information unique to the managed process, selected from the group comprising: installation date of software to the millisecond, processor UUID, MAC address of network interfaces, serial number or UUID of disk drives, and a secure hashing algorithm selected from the group comprising MD5, SHA-2, or SHA-3.

11. The method of claim 1, wherein the trusted management process creates the mailbox for the first managed process and provides a Universal Resource Identifier (URI) to the mailbox using an external communication mechanism.

12. The method of claim 1, further comprising the step of the trusted management process monitoring the identity, configuration and status of the first managed process.

13. The method of claim 12, wherein the step of monitoring the identity, configuration and status of the first managed process comprises:
the managed process writing a status message to a file of a predetermined name and format within the mailbox of the managed process on the mailbox server, the status message containing identity, configuration, and status information;
the managed process updating the status message whenever there is a change in the identity, configuration or status of the managed process;
the trusted management process reading the status file of predetermined file name and format from the mailbox of the managed process to learn the identity, configuration and status of the managed process; and
the trusted management process periodically checking the timestamp of the status file within the mailbox of the managed process to detect changes in the file, and upon discovering a modification, rereading the file to obtain updated information.

14. The method of claim 1, further comprising the step of the trusted management process monitoring the health of the first managed process using a heartbeat signal.

15. The method of claim 14, wherein the step of monitoring the health of a managed process using a heartbeat signal comprises:
the managed process writing a heartbeat message to a file of predetermined name and format within the mailbox associated with the managed process at regular intervals, the heartbeat file containing a time stamp when written and a maximum update time interval;
the managed process updating the heartbeat file prior to expiration of the maximum update time interval last written to the heartbeat file;
the trusted management process periodically reading the heartbeat file of predetermined name and format from the mailbox of the managed process; and
the trusted management process comparing the time interval since the heartbeat file was last updated (LUT) to the maximum update time (MUT) interval specified within the heartbeat file, considering the managed server offline if LUT $>(N \times MUT)$, where N is a configurable value such that $N>=1$.

16. The method of claim 1, further comprising the step of the trusted management process sending a command to the first managed process.

17. The method of claim 16, wherein the step of sending a command to a managed process comprises:
  the trusted management process writing a command message to a file of a predetermined name and format within the mailbox of the managed process.
  the managed process periodically scanning the mailbox of the managed process for the command file of the predetermined file name and format;
  upon finding the command file, the managed process reading and then deleting the command file;
  to ensure that commands are not lost through timing issues, the trusted management process not writing additional commands until the previous command file has been deleted;
  the managed process returning any response to the command by writing a response message to a file of a predetermined name and format within its mailbox;
  the trusted management process periodically checking the mailbox for the presence of the response file of predetermined name; and
  upon finding a response file, the trusted management process reading and deleting the response file.

18. The method of claim 17, wherein the trusted management process immediately writes additional commands by adding a sequence number to the predetermined command file name, the managed process reading all command files in order of sequence number.

19. The method of claim 1, further comprising the step of the first managed process sending a request to the trusted management process.

20. The method of claim 19, wherein the step of sending a request to the trusted management process comprises:
  the managed process writing a request message to a file of a predetermined name and format within the mailbox associated with the managed process;
  the trusted management process periodically scanning the mailbox of the managed process for the request file of the predetermined file name;
  upon finding the request file, the trusted management process reading and then deleting the request file;
  to ensure that requests are not lost through timing issues, the managed process not writing additional requests until the previous request file has been deleted;
  the trusted management process returning any response to the request by writing a response message to a file of a predetermined name and format to the mailbox of the managed process;
  the managed process periodically checking the mailbox for the presence of the response file of predetermined name; and
  upon finding a response file, the managed process reading and deleting the response file.

21. The method of claim 20, wherein the managed process immediately writes additional requests by adding a sequence number to the predetermined request file name, the trusted management process reading all request files in order of sequence number.

22. The method of claim 20, wherein the managed process writes the request message to a mailbox associated with the trusted management process rather than a mailbox associated with the managed process, with any response from the trusted management process written to the mailbox of the managed process.

23. The method of claim 1, wherein a plurality of trusted management processes jointly monitor and manage a population of managed processes in order to provide scalability, redundancy, and fault-tolerance for the management functions.

24. The method of claim 1, wherein guest access to a message file within the mailbox of a first managed process can be delegated to a second managed process by providing the second managed process with a universal resource identifier (URI) to the file.

25. The method of claim 1, wherein a plurality of trusted management processes comprise a migration manager operative for migrating a server image from a source server to a target server, a plurality of managed processes comprising a population of source servers that are available for migration, and a plurality of managed processes comprising a population of target servers that are available as targets for a migration, and wherein the migration manager effects the migration of a server image from a source server to a target server by sending commands to the source and target servers through their respective mailboxes.

26. A system for effecting communications between a trusted management process executing on a first computer system and a plurality of managed processes executing on one or more second computer systems in a distributed computing environment, the trusted management process and the managed processes being connected for electronic communications via a data communication network with a mailbox server executing on a processor associated with a third computer system, comprising:
  a mailbox server on the third computer system for communications between the trusted management process and one of more managed processes, the mailbox server hosting a first mailbox associated with a first managed process and a second mailbox associated with a second managed process, the first mailbox storing one or more messages used for communications between the trusted management process and the first managed process, the second mailbox storing one or more messages used for communications between the trusted management process and the second managed process, each message comprising a digital file stored within a mailbox on the mailbox server, each file within a mailbox having a file name and a predetermined data format that is specific to the type of message being communicated between the trusted management process and the managed process, the mailbox server controlling access to the files stored within each mailbox such that the files are accessible only to the managed process associated with the mailbox and the trusted management process;
  the mailbox server providing secure communications between the trusted management process and the managed processes by enforcing predetermined access control policies for each mailbox;
  the mailbox server comprising computer-executable program code that, when executed on the third computer system implementing the mailbox server, carries out instructions on the processor associated with the third computer system, comprising:
  creating a mailbox on behalf of the first managed process on the mailbox server for use in communicating with the trusted process using a universally unique identifier (UUID);
  scanning the mailboxes on the mailbox server at predetermined intervals on behalf of the trusted management process to identify new mailboxes created by managed processes;

receiving a message from the trusted management process directed to the first managed process;

in response to receipt of the message from the trusted management process directed to the first managed process, writing a file of a predetermined name and format to the mailbox of the first managed process;

scanning the mailbox on behalf of the first managed process at predetermined intervals for a file of the predetermined name to access the message from the trusted management process;

receiving a message from the first managed process directed to the trusted management process;

in response to receipt of the message from the first managed process directed to the trusted management process, writing a file of a predetermined name and format to the mailbox of the first managed process on the mail server; and the trusted management process receiving the message from the first managed process by scanning the mailbox of the first managed process for a file of the predetermined name at predetermined intervals.

27. A method for effecting communications between a trusted management process executing on a first computer system and a plurality of managed processes executing on one or more second computer systems in a distributed computing environment, the trusted management process and the managed processes being connected for electronic communications via a data communication network with a mailbox server on a third computer system, comprising the steps of:

providing a mailbox server for communications between the trusted management process and the managed processes, the mailbox server hosting a first mailbox associated with a first managed process and a second mailbox associated with a second managed process, the first mailbox storing one or more messages used for communications between the trusted management process and the first managed process, the second mailbox storing one or more messages used for communications between the trusted management process and the second managed process, each message comprising a digital file stored within a mailbox on the mailbox server, each file within a mailbox having a file name and a predetermined data format that is specific to the type of message being communicated between the trusted management process and the managed process, the mailbox server controlling access to the files stored within each mailbox such that the files are accessible only to the managed process associated with the mailbox and the trusted management process;

the first managed process creating a mailbox on the mailbox server for use in communicating with the trusted process using a universally unique identifier (UUID);

the trusted management process scanning the mailboxes on the mailbox server at predetermined intervals to identify new mailboxes created by managed processes;

the trusted management process sending a message to the first managed process by writing a file of a predetermined name and format to the mailbox of the first managed process;

the first managed process accessing the message from the trusted management process by scanning the mailbox of the first managed process on the mailbox server for a file of the predetermined name at predetermined intervals, the first managed process sending a message to the trusted management process by writing a file of a predetermined name and format to the mailbox of the first managed process on the mailbox server;

the trusted management process receiving the message from the first managed process by the scanning the mailbox of the first managed process for a file of the predetermined name at predetermined intervals; and the trusted management process monitoring the health of the first managed process using a heartbeat signal, comprising the further steps of:

the managed process writing a heartbeat message to a file of predetermined name and format within the mailbox associated with the managed process at regular intervals, the heartbeat file containing a time stamp when written and a maximum update interval;

the managed process updating the heartbeat file prior to the expiration of the maximum update time last written to the heartbeat file;

the trusted management process periodically reading the heartbeat file of predetermined name and format from the mailbox of the managed process; and the trusted management process comparing the time interval since the heartbeat file was last updated (LUT) to the maximum update time (MUT) specified within the heartbeat file, considering the managed server offline if LUT>(N×MUT), where N is a configurable value such that N>=1.

\* \* \* \* \*